Feb. 18, 1958  G. A. LYON  2,823,955
WHEEL STRUCTURE
Filed March 4, 1953
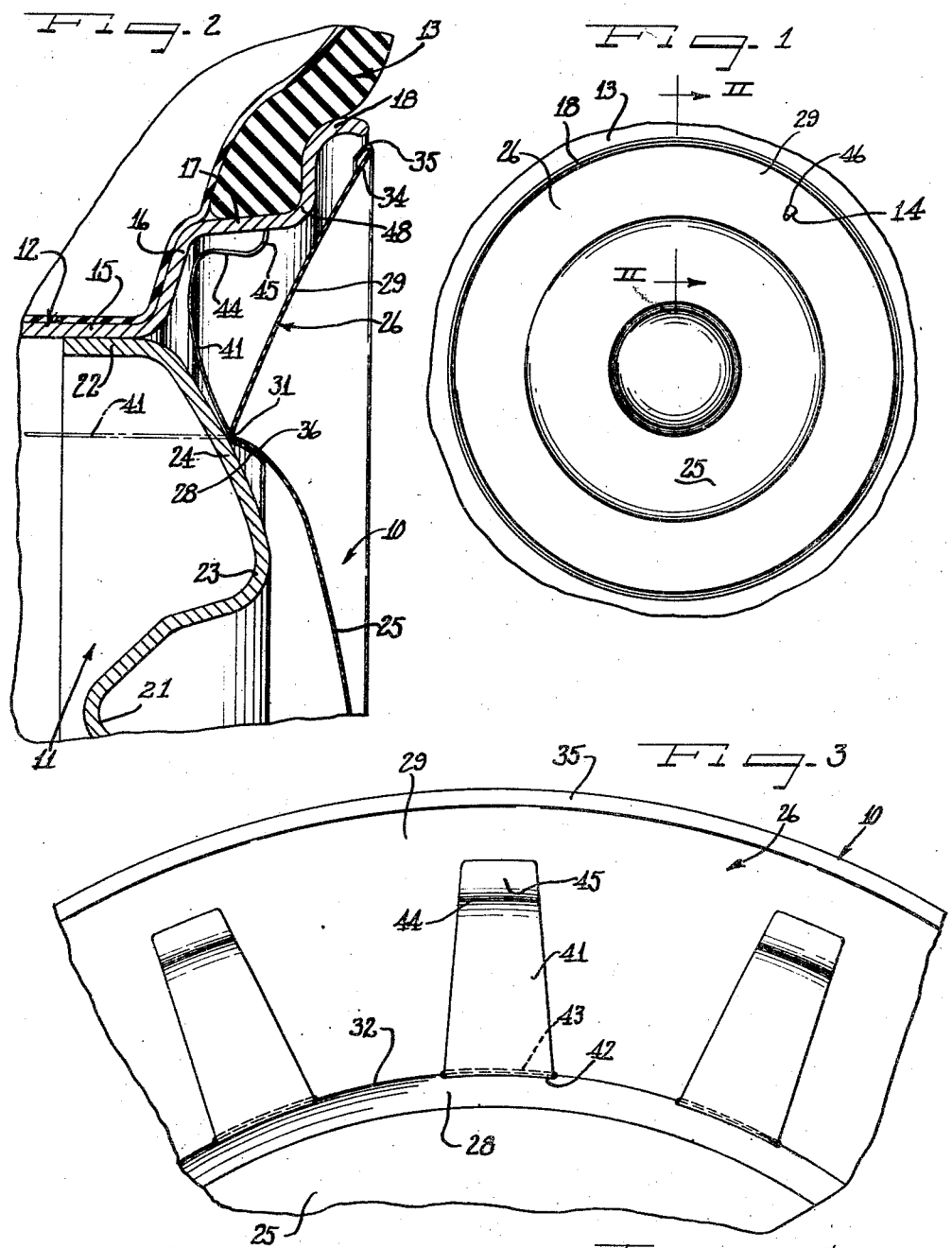
Inventor
George Albert Lyon

United States Patent Office 2,823,955
Patented Feb. 18, 1958

2,823,955

WHEEL STRUCTURE

George Albert Lyon, Detroit, Mich.

Application March 4, 1953, Serial No. 340,183

16 Claims. (Cl. 301—37)

The present invention relates to improvements in wheel structures and more particularly concerns the ornamental and protective covering of the outer sides of the vehicle wheels.

An important object of the present invention is to provide a wheel structure having a novel cover for the outer side of the wheel.

Another object of the present invention is to provide an improved composite vehicle wheel cover.

A further object of the invention is to provide means for attaching the crown portion of a wheel cover to the ring portion of the wheel cover, the attaching means also providing means for retaining the cover assembly on the wheel structure.

In accordance with the general features of this invention there is provided in a wheel structure including a tire rim and wheel body, a cover for the outer side of the wheel including a first member retained in position on the wheel and having a portion for substantially covering the tire rim in spaced relation, the cover having a second member attached to the first member and including attaching means comprised of circumferentially disposed fingers, retainingly interfitting in registering openings in the first member and extending behind the cover.

According to the other features of the invention, there is provided in a wheel cover for dispostion at the outer side of a vehicle wheel, a pair of cover members, one of which has slots therein, and the other of which has extensions or fingers thereon fitting within the slots and retaining the cover members in assembly, said extensions including resilient means for detachably retaining the cover assembly in engagement with the wheel.

Other objects, features and advantages of the present invention will be readily apparent from the following detailed description of a preferred embodiment thereof taken in conjunction with the accompanying drawings, in which:

Figure 1 is a front elevational view of a wheel structure embodying the features of the present invention;

Figure 2 is an enlarged fragmentary radial sectional view taken substantially on the line II—II of Figure 1; and Figure 3 is an enlarged fragmentary rear elevational view of the wheel cover showing how the spaced retaining fingers of the central crown cover portion interfit within the slots in the outer cover ring to hold the cover members in assembled relation.

A cover 10 embodying the features of the invention is adapted to be applied to the outer side of the vehicle wheel including a wheel body 11 and a tire rim 12, the latter being of the multi-flanged drop-center type adapted for supporting a pneumatic tire and tube assembly 13 provided with a valve stem 14.

The tire rim 12 comprises a base flange 15 having a side flange 16 extending generally radially outwardly and slightly axially outwardly. Directed generally axially outwardly from the side flange 16 is an intermediate flange 17 which merges with a terminal flange 18.

The wheel body 11 is perferably of the disk type and comprises a stamping made from suitable heavy gauge sheet metal and having a central flange 21 and an outer peripheral attachment flange 22 secured to the base flange of the tire rim. Intermediate the central flange 21 and the outer attachment flange, the wheel body is formed with an annular generally axially outwardly projecting reinforcing nose bulge 23.

According to the present invention, the wheel cover assembly 10 comprises a composite structure provided with means to hold the parts in assembled relation, and at the same time, in the present instance, resiliently retain the cover assembly on the wheel structure. To this end, the cover 10 comprises a central retaining crown and attachment member 25 and an annular ring member 26. The crown member 25 is dimensioned to overlie the central portion of the wheel body and the inner marginal portion of the ring member 26. The ring member is dimensioned to substantially overlie the tire rim 12 and to support the outer margin of the crown member 25.

The annular ring cover member may be stamped or rolled from suitable thin sheet material, such as stainless steel or brass or the like.

In a preferred form, the ring cover member 26 is constructed to bear against the wheel body 11 along a receding portion 24 of nose bulge 23, which extends generally radially outwardly and axially inwardly of the apex of the nose bulge.

For this purpose the ring member 26 is provided with an outwarly facing dished ring body portion 29 which is reinforced at its inner margin with an annular, generally radially inwardly and axially outwardly projecting flange or rib portion 28 to form an annular inner marginal groove junction 31 at the outer side of the ring. By preference, the projecting flange 28 is outwardly bent to form an approximate right angle with the dished portion of the ring. In this manner the backside of the ring is adapted to engage the receding portion 24 of the nose bulge in line contact along a juncture edge 32, best shown in Fig. 3, while the projecting flange and dished ring portion of the ring diverge axially outwardly in spaced relation to the wheel structure. Although I have shown the projecting flange 28 preferably spaced from the body 11, it will be observed that the annular projecting flange might be shaped to conform complementarily to the curvature of the receding portion 24 of the nose bulge, if so desired.

At its outer periphery the ring body 29 terminates in a margin 34 which has an underturned reinforcing and finishing bead or flange 35. The reinforced edge of the cover ring is thus in convenient relation to the tire rim and sufficiently strengthened for ready engagement with a pry-off tool (not shown).

The central crown portion or member 25 of the cover is comprised of a concave-convex disk type stamping made from a suitable thin gauge sheet metal such as stainless steel or brass or the like.

In a convenient manner of attaching the central crown portion 25 of the cover to the ring portion 26, the crown member is marginally assembled or seated into the groove 31 of the ring of the cover. For facilitating the centering of the crown relative to the ring, the crown is provided with a terminal portion 36 having a transverse curvature, complemental to the shape of the reinforcing flange 28 of the ring. In the present instance, the crown portion 36 overlaps the ring flange 28, and the marginal edge of the crown snugly engages the outwardly facing groove 31 of the annular cover member.

Permanent interconnection of the cover members is effected by providing the peripheral marginal edge of the crown cover member 25 with a series of spaced extension tabs or retaining fingers 41 which respectively extend through a series of similarly spaced slots 42 in the groove 31 of the ring member. By preference the retaining fingers are generally of trapezoidal shape tapering toward their tips and, in the initial assembly, extend straight axially inwardly through the slots 42, as shown in dotted outline in Fig. 2.

After the initial assembly, each of the extensions is then bent on a generally transverse line 43 about the radially outer edge of the slot 42 into generally radially outward and axially inward directed relation behind the ring of the cover substantially as indicated in full outline in Figs. 2 and 3. Each of the extensions 41 is thereby interlocked against withdrawal from its associated slot 42 by reason of the interengaged relation of the bent over extensions at the line 43.

To the end that the finger extensions may be utilized for retaining the cover on the wheel, the outer portion of each finger is shaped in an axially outward directed relation to the cover to form a resiliently yieldable body portion or section 44 which terminates in a short, stiff, radially outwardly and axially outwardly extending retaining head portion or gripping section 45 which is spaced behind the ring member 26.

It will be observed that prior to the application of the cover assembly to the wheel structure the marginal edge of the retaining head portion 45 is dimensioned to overlie the intermediate flange of the tire rim.

In applying the cover to the wheel, the cover is generally centered with relation to the wheel so that the valve stem 14 is received through a valve stem opening 46 provided in the ring body portion 29, and the terminal edges of the retaining heads 45 bottom against a rounded juncture portion 48 on the rim between rim flanges 17 and 18. The cover is then pressed axially inwardly so that the curved rim juncture portion 48 cams the resiliently yieldable heads 45 of the retaining fingers radially inwardly. As the cover is progressively moved axially onto the wheel the extremities of the fingers slide along the rim surface until the juncture edge 32 of the backside of the ring member bottoms on the receding portion 24 of the wheel body. In this position the retaining fingers engage the intermediate flange 17 and are thereby placed under tension so as to resiliently retain the cover on the wheel.

As the fingers are applied against the rim flange it will be appreciated that the fingers are free to flex from their point of attachment to the cover. In other words, the elongated radially extending back-up finger portion connected between the cover and axial portion 44 are free to flex together thereby facilitating the retaining action of the gripping edge on head 45.

In the removing of the cover, the end of a pry-off tool or screwdriver (not shown) is inserted behind the turned or outer edge 35 of the cover and leverage is applied to exert an axially outward force on the ring 26 using the terminal flange 18 of the tire rim as a fulcrum. This results in releasing the fingers 41 from their gripping engagement with the flange of the tire rim.

The fingers 41 and the slots 42 may be of any suitable number and distributed in any suitable spaced pattern around the circumference of the crown portion.

It will be understood that modifications and variations may be effected without departing from the scope of the novel concepts of the present invention.

I claim as my invention:

1. In a wheel structure including a multi-flanged tire rim having an intermediate generally axially extending flange and a load-sustaining body, a cover including an annular portion having an annular series of apertures and a circular portion having a series of generally radially outwardly extending retaining fingers respectively passing through said apertures for connecting said portions together, said fingers having ends formed to engage the intermediate flange for retaining the cover on the wheel structure, said annular portion concealing said fingers and having a radially and axially outwardly directed outer portion spaced from said tire rim, the outer edge of the annular cover portion having a pry-off edge engageable by a pry-off tool for flexing the fingers out of gripping engagement with the intermediate tire rim flange.

2. In a cover construction for disposition at the outer side of a vehicle wheel including a flanged tire rim part, an annular cover member comprising inner and outer circular portions in divergent relation to each other and defining an annular juncture groove therebetween, said annular cover member having an annular series of slots in said juncture groove, a circular crown member having a marginal edge adapted to seat in the juncture groove, a series of radial extensions projecting respectively generally radially outwardly from said crown member through said slots for interlocking the cover members, said retaining fingers extending behind said cover and being tensioned to resiliently interengage the tire rim flange whereby the cover construction is retained on the vehicle wheel.

3. In a wheel structure including a rim member having a flange inclined generally axially outwardly, an annular wheel cover substantially overlying said rim, a circular crown cover overlying said annular cover, cover retaining means interlocking said annular and circular covers and extending behind said covers, said cover retaining means being resiliently flexible for gripping the flange of the wheel and said annular cover having an outer edge spaced from said rim to facilitate disengagement of said cover members when pry-off pressure is applied to release said covers from the wheel structure.

4. In a wheel structure having a multi-flanged tire rim part, a cover assembly for said wheel structure comprising an annular ring portion extending generally radially and axially outwardly and including an inner annular portion extending radially inwardly and axially outwardly, said inner and outer portions merging and defining a grooved juncture, a circular crown member having a marginal edge adapted to be seated in said groove juncture, extension fingers on said crown portion along the marginal edge thereof and means for interengaging the fingers of the crown portion with the annular cover ring, said fingers further serving to grippingly engage said tire rim to retain the cover assembly on the wheel structure.

5. In a wheel structure including a multi-flanged tire rim part having an intermediate generally axially extending flange merging into a radially outwardly directed terminal flange and a load sustaining body part connected to said rim, a cover assembly for the outer side of said wheel structure comprising an annular ring member substantially overlying the tire rim and having a dished outer ring portion spaced from the tire rim and a reinforcing inner flange portion, said portions converging axially inwardly to define an annular juncture groove on the outside of the ring and providing on the backside of said ring an annular juncture area for bottoming of said cover against said body, a crown member of concave-convex shape and having a terminal portion overlying the flange portion of the ring in overlapping engagement, said terminal portion being seated in the groove of the ring, and means for interconnecting the cover members and retaining said cover assembly on said wheel comprising a series of generally radially outwardly extending retaining fingers along the periphery of said retaining member and interfitting respectively in a series of apertures in said juncture groove, said fingers having terminal portions adapted to resiliently engage the intermediate flange of said rim.

6. In a cover for disposition at the outer side of a wheel, a circular cover member having an axially outwardly opening annular groove, a series of apertures in the bottom of said groove, and a second circular cover member having an edge seated in said groove and provided with extensions retainingly engaging through said apertures, said extensions comprising resilient cover retaining elements for detachably maintaining the cover members on the wheel.

7. In a wheel structure having a wheel including a generally axially extending flange, a multi-part cover assembly for said wheel including a radially outer ring part and a central circular part telescopingly nested therein, one of said parts having slots and the other having cover retaining fingers projecting through said slots and radially outwardly behind but in divergent relation to said ring part to interlock said parts together in nested relation and for engaging said wheel flange to hold the cover assembly on the wheel.

8. In a wheel structure including body and rim parts with one of the parts having an axial flange, a cover body for disposition at the axially outer side of the wheel and circumferentially spaced cover retaining fingers each connected at one end to the cover body and extending generally radially therefrom, said fingers each having a generally radially and freely extending finger portion leading into and backing up a generally axially extending finger portion with the latter finger portion disposed in generally face to face relation with said axial flange and provided with a resiliently deflectable free edge capable of being stressed radially upon engagement with said axial flange, both of said finger portions of each finger being resiliently flexible upon stressing of said edges so that substantially all of each finger resiliently flexes from its end connected to the cover body, said cover including an annular ring member and an inner circular cover member with one of the members provided with circumferentially spaced apertures and the other of said members provided with said fingers each extending through one of said apertures thereby interlocking the members together.

9. In a wheel structure including body and rim parts with one of the parts having an axial flange, a cover body for disposition at the axially outer side of the wheel and circumferentially spaced cover retaining fingers each connected at one end to the cover body and extending generally radially therefrom, said fingers each having a generally radially and freely extending finger portion leading into and backing up a generally axially extending finger portion with the latter finger portion disposed in generally face to face relation with said axial flange and provided with a resiliently deflectable free edge capable of being stressed radially upon engagement with said axial flange, both of said finger portions of each finger being resiliently flexible upon stressing of said edges so that substantially all of each finger resiliently flexes from its end connected to the cover body, said cover including an inner circular cover member and an annular ring member with one of said members provided with an annular seat with circumferentially spaced openings therein and the other of said members having said fingers joined thereto and bottomed on said seat with the fingers extending through the corresponding openings thereby interlocking the members together in said seat.

10. In a wheel structure, a wheel including body and rim parts with one of the parts having an axial flange portion, a cover body for disposition at the axially outer side of the wheel and circumferentially spaced cover retaining fingers each connected at one end to the cover body and extending generally radially therefrom, said fingers each having a dished generally radially and freely flexible finger portion leading into and backing up a generally axially outwardly extending freely flexible finger portion with the latter finger portion disposed in generally face to face relation with said axial flange portion and provided with a free edge resiliently deflectable with said axial finger portion and said free edge being stressed radially upon engagement with said axial flange portion, said free edges being disposed in a common circle having a diameter slightly at variance with said axial flange portion for tensioned cover retaining engagement therebetween, both of said finger portions of each finger being resiliently flexible upon stressing of said edges so that substantially all of each finger resiliently flexes from its end connected to the cover body, said axial finger portion also being resiliently flexible radially with respect to said radial finger portion to permit ready adjustment for any misalignment between the particular finger and the axial flange portion, and a portion of said cover being bottomed against said wheel to backup the engagement of said free edge with said axial flange portion.

11. The wheel structure of claim 10 further characterized by each of said fingers including a generally radially extending leg portion interposed between the axially outwardly extending finger portion and the free edge for radially spacing the axially outwardly extending finger portion from the axial flange portion.

12. The wheel structure of claim 10 further characterized by the cover body comprising an inner circular cover member and an outer ring member with the fingers being integral extensions from the inner circular cover member and with the outer ring member having circumferentially spaced slots with the circumferentially spaced fingers extended through the slots maintaining the cover and ring members in interlocked assembly.

13. The wheel structure and more particularly the cover body of claim 10 further characterized as comprising an inner circular cover member and an outer ring member with the fingers being integral extensions from the inner circular cover member and with the outer ring member having circumferentially spaced slots with the circumferentially spaced fingers extended through the slots maintaining the cover and ring members in interlocked assembly, said portion of said cover bottomed against said wheel being positioned generally at the area of interlocking engagement between the inner cover and outer ring members.

14. The wheel structure of claim 10 further characterized by the fingers generally at their junction with the cover body being disposed generally in the area of the engagement of said portion against the wheel and more particularly against the body part and with the fingers being flexible from this juncture as the free edges of said fingers are stressed into engagement with the axial flange portion of the tire rim.

15. The wheel structure of claim 10 further characterized by the cover body having an inner circular cover portion and an outer annular portion having a dished juncture with said portion bottomed against the wheel being disposed generally at such juncture and with the fingers radially emanating generally from the juncture and being bisable between the juncture and the axial flange portion.

16. The wheel structure of claim 10 further characterized by the cover body having an inner circular cover portion and an outer annular portion having a dished juncture with said portion bottomed against the wheel being disposed generally at such juncture and with the fingers radially emanating generally from the juncture and being bisable between the juncture and the axial flange portion, said outer annular portion overlying and concealing said extensions and being spaced from the rim at its outer margin so a pry-off tool may be engaged thereunder to release the portion bottomed against the wheel so as to eliminate the back-up for the free edges to facilitate removal of the cover body from the wheel.

References Cited in the file of this patent

UNITED STATES PATENTS

| | | |
|---|---|---|
| 2,309,519 | Lyon | Jan. 26, 1943 |
| 2,405,587 | Lyon | Aug. 13, 1946 |
| 2,444,053 | Lyon | June 29, 1948 |
| 2,576,130 | Lyon | Nov. 27, 1951 |
| 2,576,683 | Horn | Nov. 27, 1951 |